(12) United States Patent
Dubuc

(10) Patent No.: US 7,033,060 B2
(45) Date of Patent: Apr. 25, 2006

(54) METHOD AND APPARATUS FOR IRRADIATION OF PLANTS USING LIGHT EMITTING DIODES

(75) Inventor: Eden Dubuc, Lachine (CA)

(73) Assignee: GELcore LLC, Valley View, OH (US)

( * ) Notice: Subject to any disclaimer, the term of this patent is extended or adjusted under 35 U.S.C. 154(b) by 192 days.

(21) Appl. No.: 10/675,658

(22) Filed: Sep. 30, 2003

(65) Prior Publication Data

US 2004/0233672 A1 Nov. 25, 2004

Related U.S. Application Data

(60) Provisional application No. 60/472,869, filed on May 23, 2003.

(51) Int. Cl.
*F21V 7/04* (2006.01)
(52) U.S. Cl. ...................... 362/600; 362/218; 362/234; 362/297; 362/365; 362/612
(58) Field of Classification Search ................ 362/600, 362/612, 234, 218, 294, 365, 367, 368, 396, 362/249, 800; 361/688, 690, 704, 707, 719; 174/252; 165/80.2, 80.3, 104.33
See application file for complete search history.

(56) References Cited

U.S. PATENT DOCUMENTS

| | | | |
|---|---|---|---|
| 6,305,874 B1 * | 10/2001 | Custers et al. | ................. 404/9 |
| 6,340,868 B1 * | 1/2002 | Lys et al. | ................ 315/185 S |
| 2002/0154504 A1 | 10/2002 | Fang et al. | |
| 2003/0005626 A1 | 1/2003 | Yoneda | |

FOREIGN PATENT DOCUMENTS

EP 1300066 4/2003

* cited by examiner

*Primary Examiner*—Sandra O'Shea
*Assistant Examiner*—Mark Tsidulko
(74) *Attorney, Agent, or Firm*—Fay, Sharpe, Fagan, Minnich & McKee, LLP

(57) ABSTRACT

A method for using LEDs to supplement natural light in a greenhouse and a support structure for attaching LEDs in a greenhouse so that the plants receive substantially even light distribution from the LEDs and minimal natural light is blocked by the lighting system. A narrow attachment rail is used to suspend a strip of LEDs from the frame structure of the greenhouse.

54 Claims, 14 Drawing Sheets

METHOD AND APPARATUS FOR IRRADIATION OF PLANTS USING LIGHT EMITTING DIODES

This application claims the benefit of U.S. Provisional Application 60/472,869, filed May 23, 2003.

FIELD OF THE INVENTION

The present invention relates to a method and apparatus for using light emitting diodes in a greenhouse setting. More particularly, it relates to a method of using LEDs to supplement natural light and a support structure for using LEDs in a greenhouse setting.

DESCRIPTION OF RELATED ART

Sunlight is made up of a variety of wavelengths. The energy of light is inversely proportional to its wavelength. In other words, the longer the wavelength the less energy the light has. Sunlight can be separated into different wavelengths or colors by passing it through a prism. Similarly, when the sun is at an angle to the earth's atmosphere, the light is reflected and spread by the atmosphere. This is why sunrises and sunsets are so colorful. Another less desirable result of this phenomenon is that a portion of blue light is not transmitted through the atmosphere during the winter.

The light humans see is in the visible spectrum. Visible light ranges from approximately 400 nm to approximately 700 nm. Violet light is the shortest wavelength; highest energy light of the visible spectrum and red light is the longest wavelength, lowest energy light of the visible light. The longer the wavelength of visible light the more red its color. Ultraviolet light has a shorter wavelength and has more energy than visible light. X-rays are the highest energy, shortest wavelength light. Infra red light is a low energy light, having a wavelength longer than that of red light. A large portion of sunlight is in the infrared range.

Photosynthesis is the process that converts energy from sunlight or other light to chemical forms of energy that can be used by biological systems. Energy for photosynthesis is provided by light, which is absorbed by the pigments of the plant. The color and intensity of light are used in different photosynthesis reactions. For example, blue light plus water plus carbon dioxide produces oxygen and sugar while red light plus water plus sugar produces plant cells. The brighter or more intense the light, the more energy the plant receives. Red light promotes height and blue light promotes growth in girth. Thus, plants grown in red light will be tall and spindly and plants grown in blue light will have a thick, strong stem, but will not be especially tall.

In greenhouses, it is often desirable to control a plant's growth. For example, due to conditions, customer or seasonal demands, transportation issues, etc. it may be desirable to promote or inhibit budding, promote or inhibit flowering, promote germination, promote the leafiness of the plant, encourage a strong and/or lengthy stem, have a stronger plant, have a bigger harvest, and/or promote or inhibit ripening of a fruit or vegetable.

Commonly, greenhouses will use lights to encourage or discourage plant growth. Common types of lighting for landscapes and greenhouses include incandescent lights, florescent lights, high-pressure sodium lights, medal halide lights, and mercury vapor lights. Incandescent lights produce all wavelengths of light and are closest to natural sunlight. Thus, they are commonly used to promote vegetative growth. The amount of intensity of particular wavelengths of light may be adjusted with the type of lights used to control growth mode. In addition to controlling growth modes with light, growth modes can also be controlled by adjusting or changing the fertilizer, stressing the plant such as with cold, shorter or longer lighted periods or by adding a lighted period at night.

In the winter the sun is lower on the horizon. When sunlight passes through the ozone layer about 50% of the blue light is reflected off the ozone layer rather than being transmitted. Incandescent lights, while mimicking natural light tend to be comprised of a higher percentage of low energy light than natural light. Thus, a plant grown under incandescent light or under natural winter light tends to get less blue light than is optimal. There is a need for a system which can be used to supplement the natural light in the winter by providing the high frequency wavelengths reflected by the ozone layer to the plants with minimal interference with the amount of natural light.

Flower producers may wish to grow leafy, strong plants, but discourage flowering until it is the season for the plant. A greenhouse vegetable producer may wish to encourage germination growth, budding and fruiting of plants but then inhibit ripening of the vegetable so that is not overly ripe at the time it reaches the food market. Thus, there is a need for a plant illumination system which allows the grower to supplement natural light to adjust the growth mode of plant without interring with the amount of natural light received.

Light Emitting Diodes (LED) consists of a layer of two different semi-conductors. They can be used to provide a source for light with a specific wavelength.

Currently, light emitting diodes LEDs have been used for low light, small size greenhouse environments. There is a need for an LED plant illumination system, which allows for the use of LEDs on a large scale, such as a commercial greenhouse.

There is a need for a plant illumination system, which makes use of LEDs to provide the desired light intensity and/or wavelength to promote or discourage specific growth modes without interfering with the natural light. There is also a need for a system that can be used with natural light, artificial light or a combination of artificial and natural light without blocking a significant amount of the light.

Prior art lighting systems for greenhouses are about 18 cm wide and, thus, block a portion of the natural light. There is a need for a system that reduces the amount of blocked natural light.

Prior art lighting systems are heavy. A single sodium vapor lamp can weigh 40 pounds. There is a need for a lightweight lighting system.

The lamps of prior art lighting systems must be placed far above the plants. There is a need for a lighting system which can be located close to the plants allowing for a shorter greenhouse.

SUMMARY OF THE INVENTION

The present invention relates to an illumination system for plants to supplement natural light without substantially interfering with the amount of natural light. The present invention uses a strip of high brightness LEDs that deliver uniform illumination. The LED strip reduces energy and maintenance costs. The strip system may be installed in a commercial greenhouse. Because of its narrow width, the strip is useful to supplement natural light because it allows a maximum amount of natural light to reach the plants.

In one embodiment of the present invention, LEDs with specific wavelengths are used in the system for a specific effect. For example, blue LEDs to supplement the winter sunlight.

In another embodiment of the present invention the plants are exposed to sunlight and/or artificial lights, preferably, natural light or sunlight and LEDs are used to supplement the light. For example, in winter high frequency light is reflected off the ozone layer. Blue LEDs are used to supplement the natural light to compensate for the high frequency light that is not transmitted by the ozone layer. In addition, when specific wavelengths are needed for a desired effect, additional LEDs may be provided which emit light at the desired wavelengths.

DETAILED DESCRIPTION OF THE INVENTION

Figure 13:
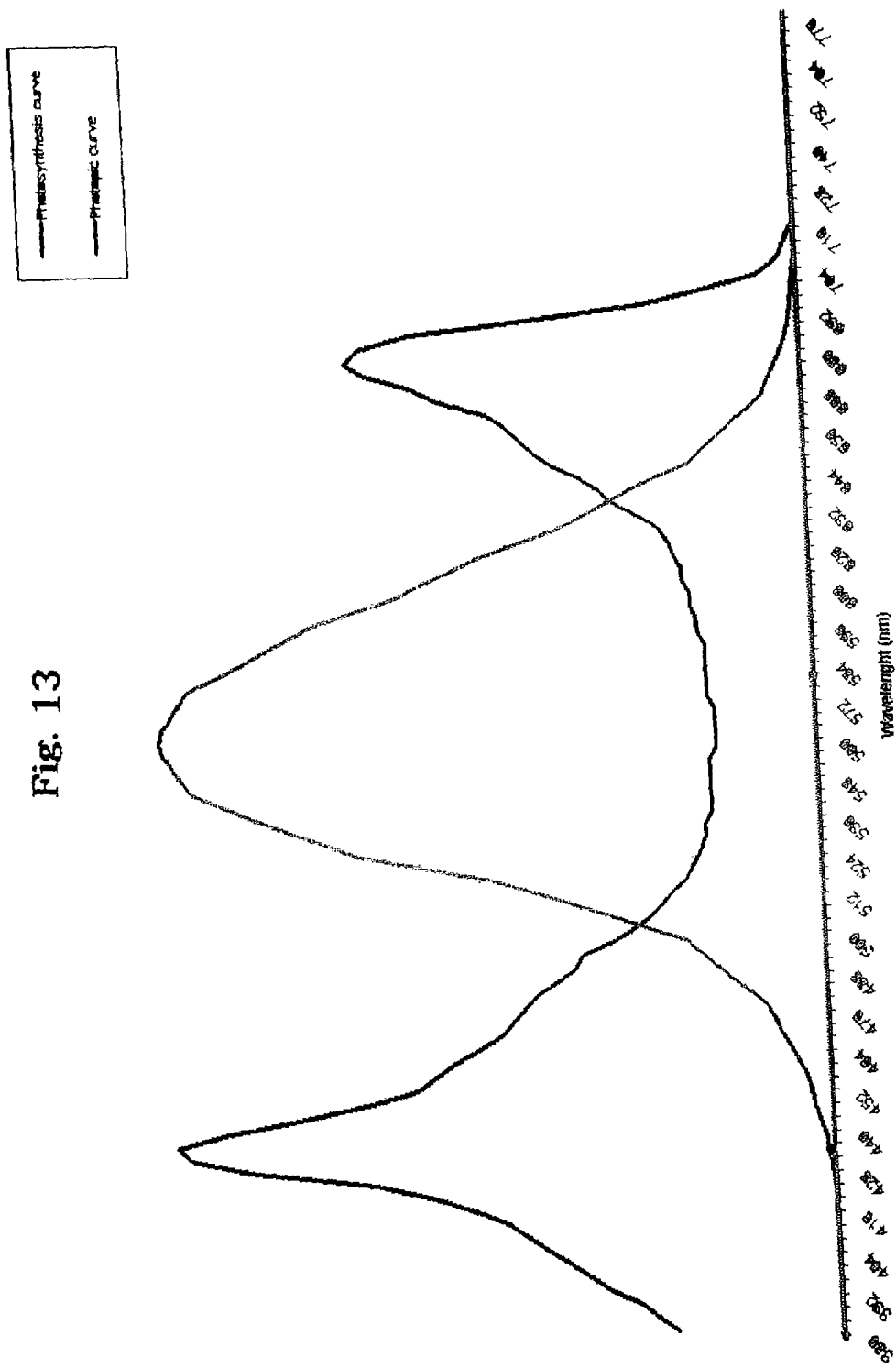
FIG. 13 shows the ideal phototropic curve and the photosynthesis curve.
Figure 14:
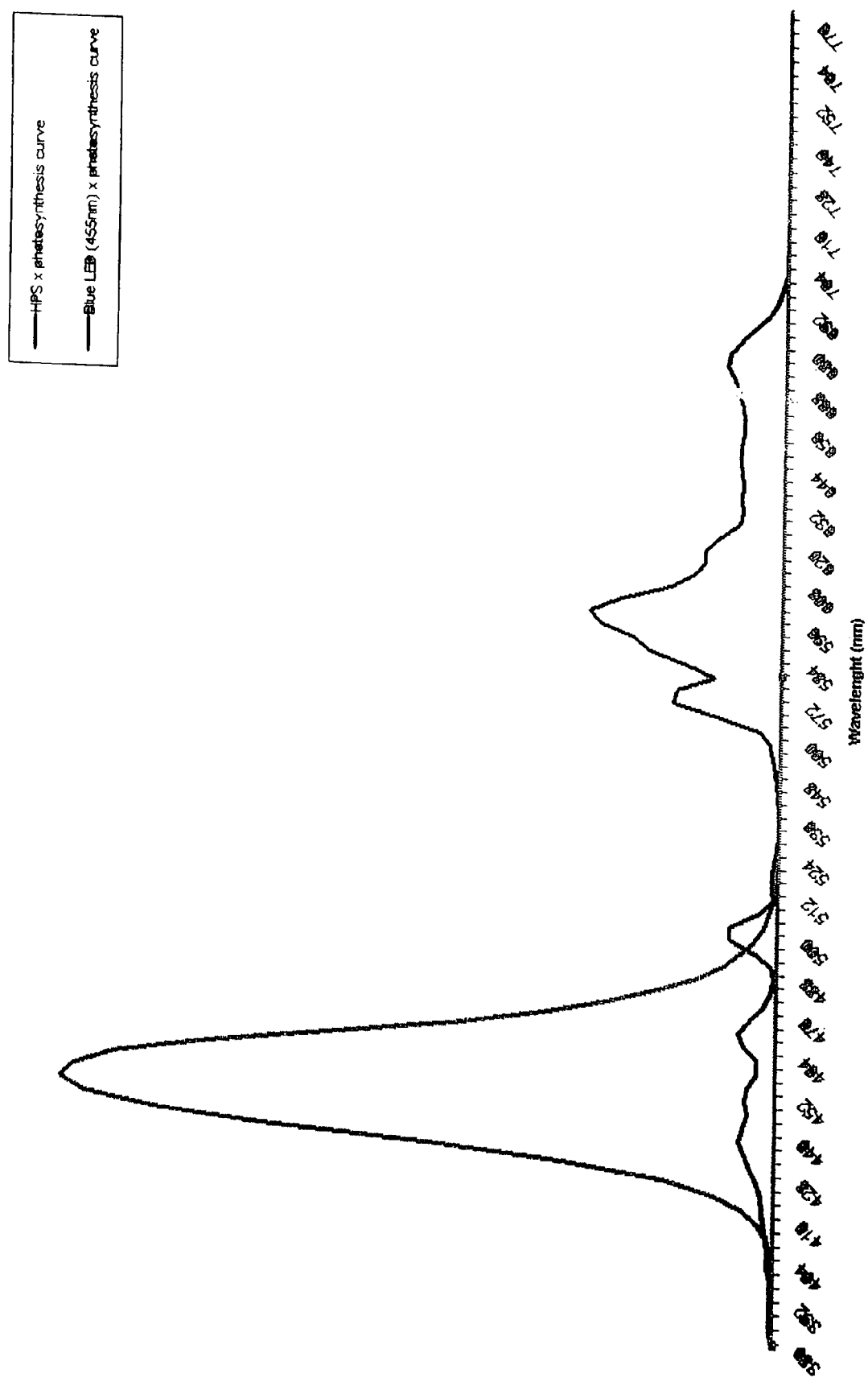
FIG. 14 shows the photosynthesis curve of the high-pressure sodium vapor lamp and the 455 nm blue LED of FIG. 12.

Plants grow due to photosynthesis. Plants use water, carbon dioxide and light to create energy and oxygen. Different wavelengths of light affect plants differently. Most plants reflect green light. Thus, the best light for most plant growth is in the red and blue wavelengths. Red light tends to make plants grow tall. Blue light tends to make plants with strong stems. As can be seen in FIG. 13, photosynthesis is maximized at about 440 nm and about 680 nm. In contrast, humans see best if the light is between about 500 and 650 nm. FIG. 13 also shows the phototropic curve. This shows the wavelengths of light that humans see best.

The maximum transmission of blue light occurs about midday. Because of the angle of the sun, the high-energy blue light tends to be reflected off the ozone layer in the morning and evening. Thus, there is less blue in the light. Similarly, there is less blue light in the winter because the earth is at an angle to the sun. In the winter about 50% of the high-energy blue light is reflected by the ozone layer and the light that is transmitted consists primarily of lower-energy light. As a result, plants may not get sufficient amounts of blue light.

Plants grown under artificial light may also be deficient in blue light. For example, high intensity sodium lamps, which are often used in greenhouses, maximize the light that can be seen by humans. Incandescent lights, which are often used in home plant growing situations, also have less blue light than the amount needed for optimal plant growth. A grower may want to supplement the amount of blue light. In some situations, the grower may wish to encourage or discourage particular plant growth modes with specific wavelengths of light. Thus, it is often necessary or desirable to supplement natural or artificial light with specific wavelengths of light.

Figure 1:
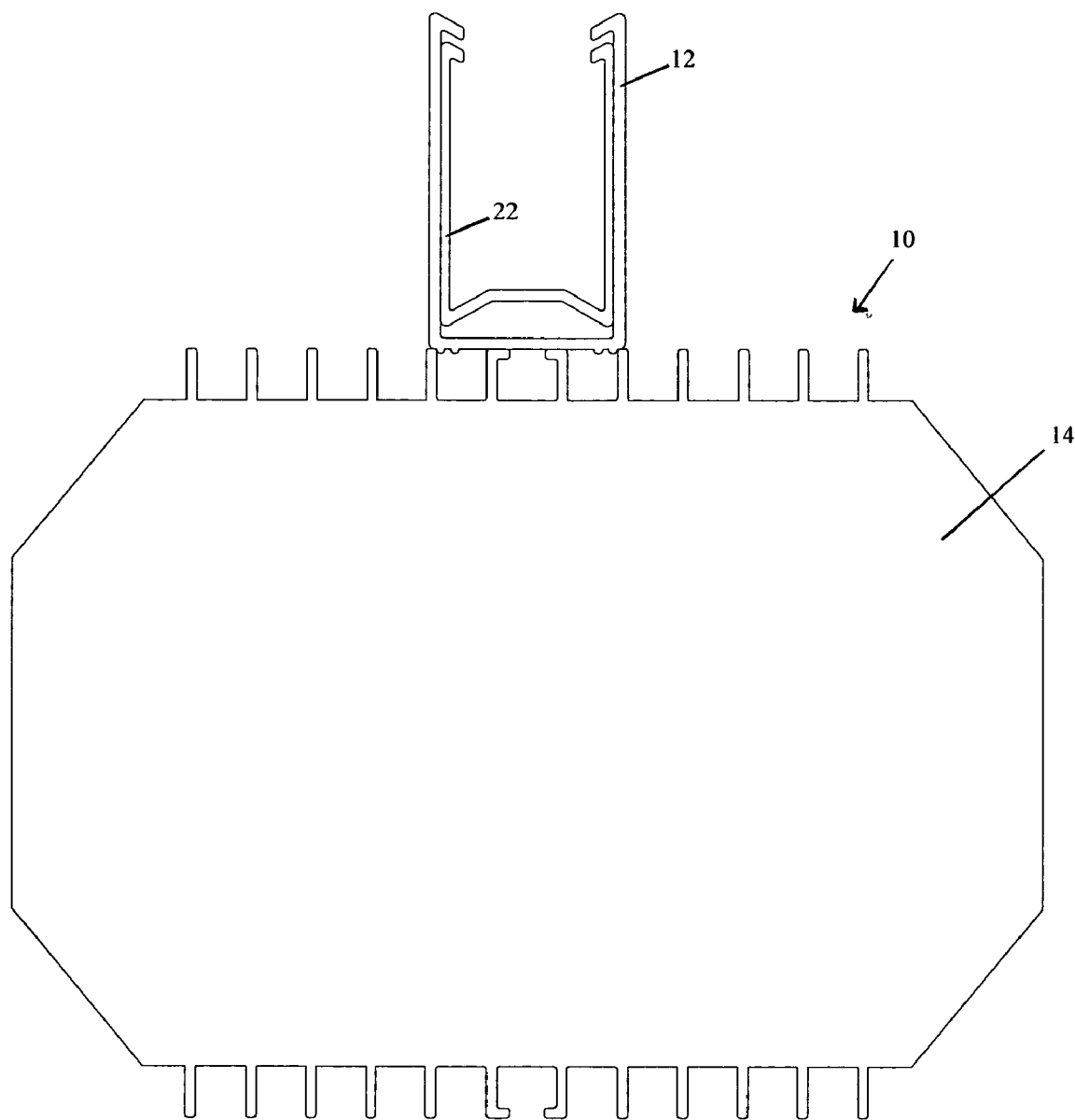
FIG. 1 is a cross section of a prior art lighting assembly.
Figure 2:
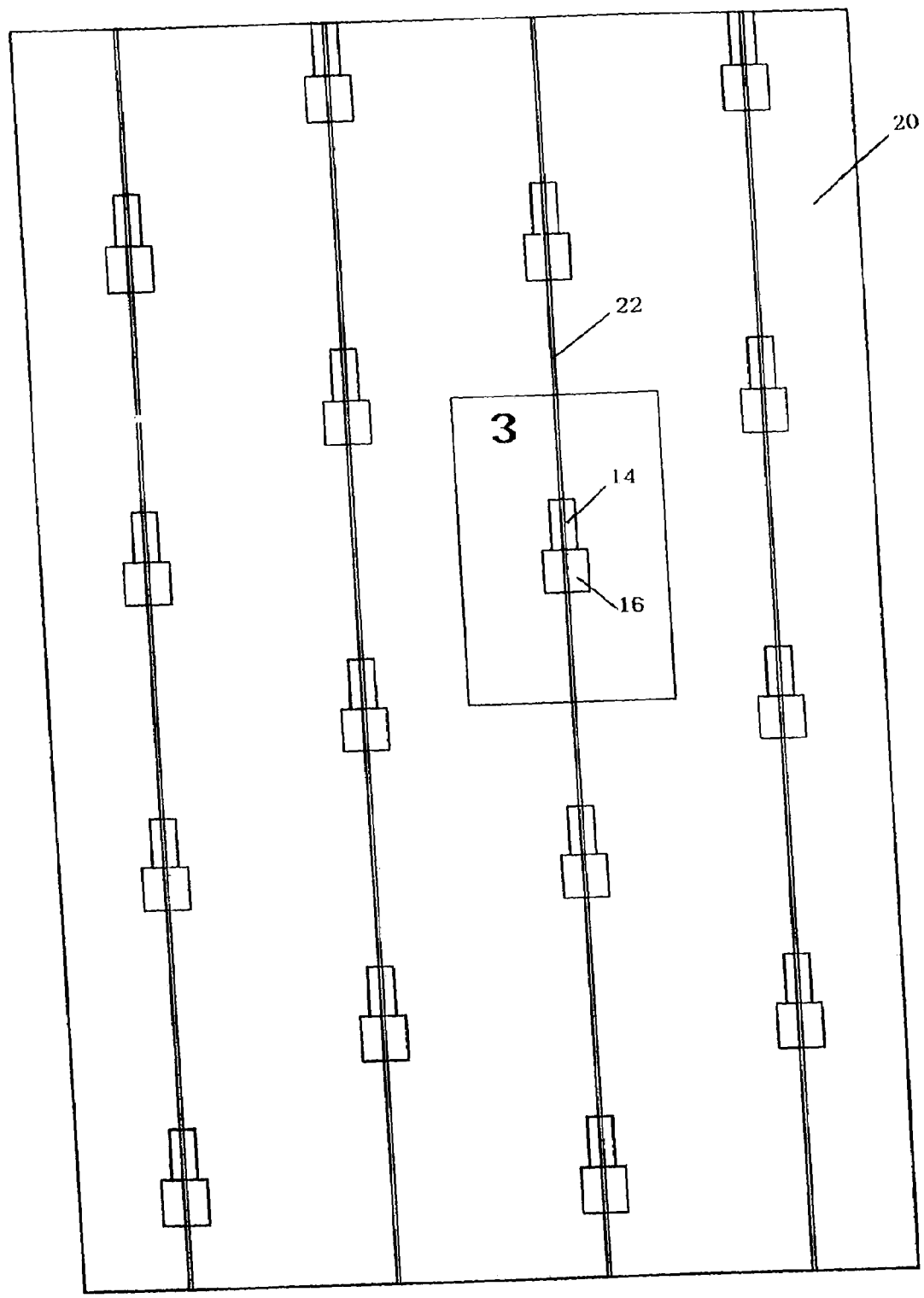
FIG. 2 is an overhead view of a prior art lighting system.
Figure 3:
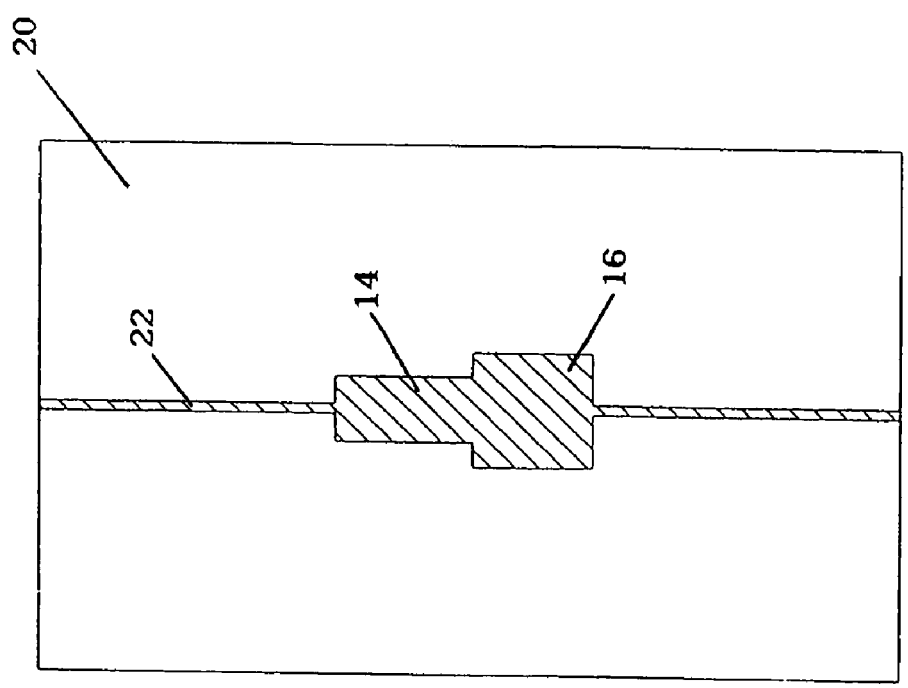
FIG. 3 is an overhead view of detail 3 of FIG. 2.

Prior art lighting systems block a portion of the natural light entering the greenhouse. As can be seen in FIGS. 1–3, prior art systems utilize bulky lights 10 that block 10% or even more of the footprint of the lighted area 20 of the greenhouse. This undesirable effect is worsened by shadows that are cast by the frame and/or lights 10. The prior art system uses a plurality of lights. For example, in a typical system using high-pressure sodium (HPS) lamps, the reflector 16 of the lamp is 35 cm wide by 35 cm long, the power supply 14 of the lamp is about 18 cm wide by 38 cm long, and the attachment supports 12 are about 4 cm wide. The greenhouse support frame 22 is about 3 cm wide.

Figure 4:
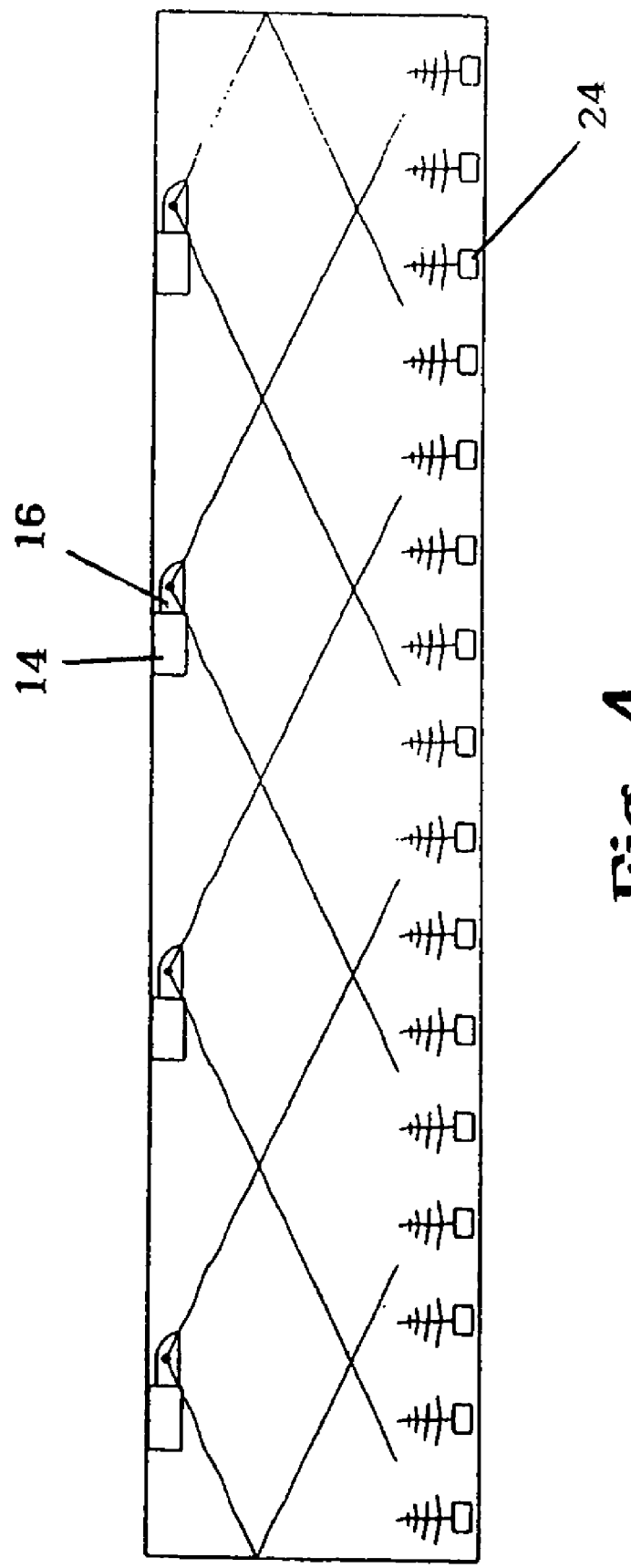
FIG. 4 is a side view of a prior art lighting system.

Another disadvantage of prior art systems is uneven lighting. As can be in FIG. 4 some plants 24 are illuminated by two lamps 10 while others are illuminated by three. As a result, the plants may not grow and mature at the same rate. Some plants may mature slowly or will not grow as large as others.

Prior art lighting systems are heavy, a single sodium vapor lamp can weigh 40 pounds. Thus, the greenhouse frame needs to be strong enough to support the lighting system. Further, prior art lighting systems have lamps that must be kept away from the plants. This requires the greenhouse structures be of sufficient height to keep the lights away from the plants.

Figure 5:
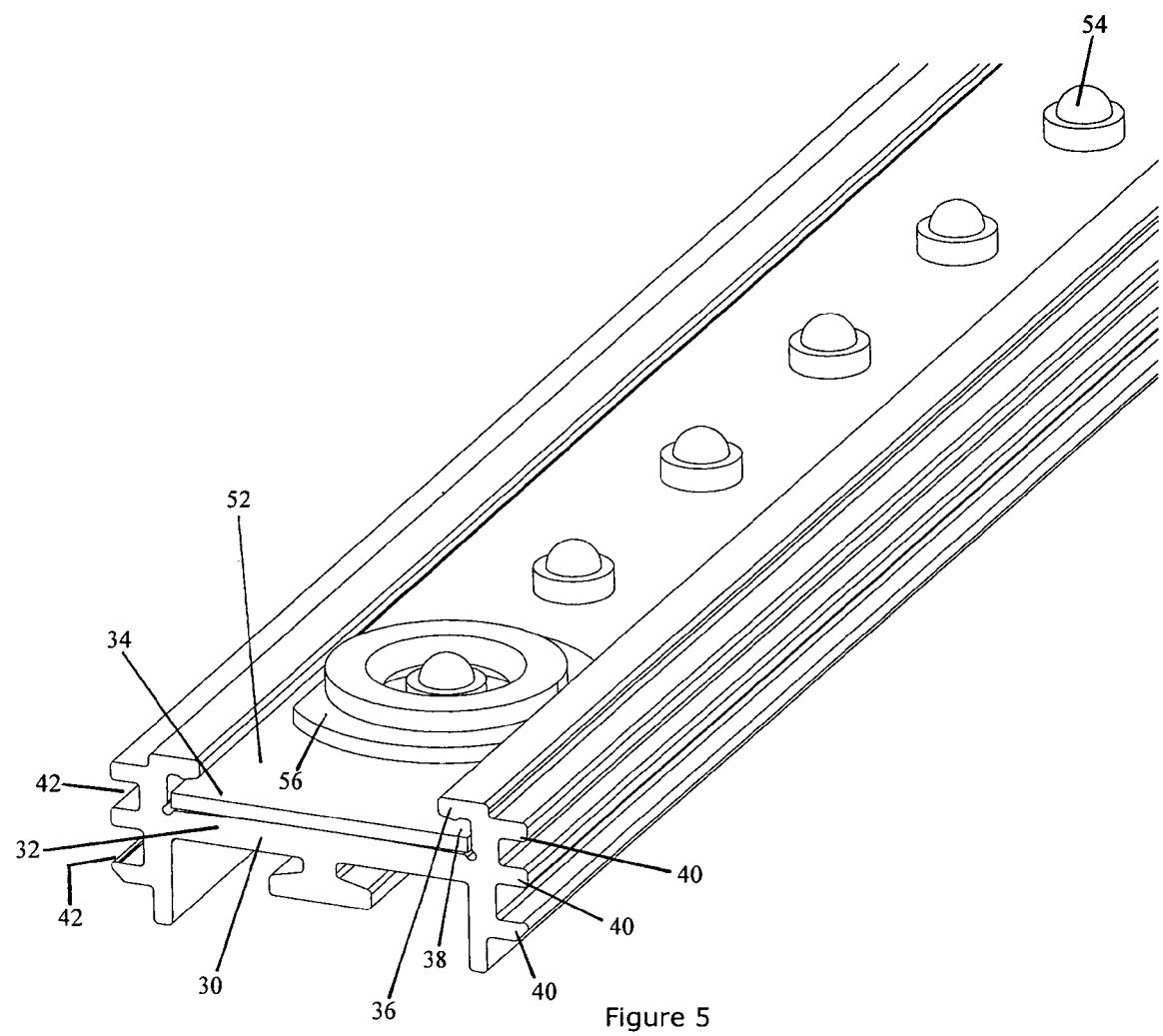
FIG. 5 is a view of the inventive lighting assembly.
Figure 6:
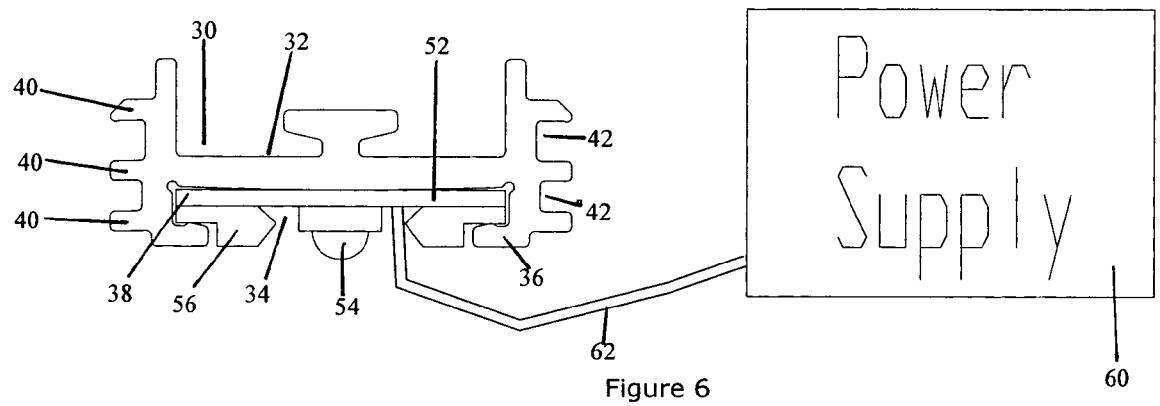
FIG. 6 is a cross section of the inventive lighting assembly.
Figure 7:
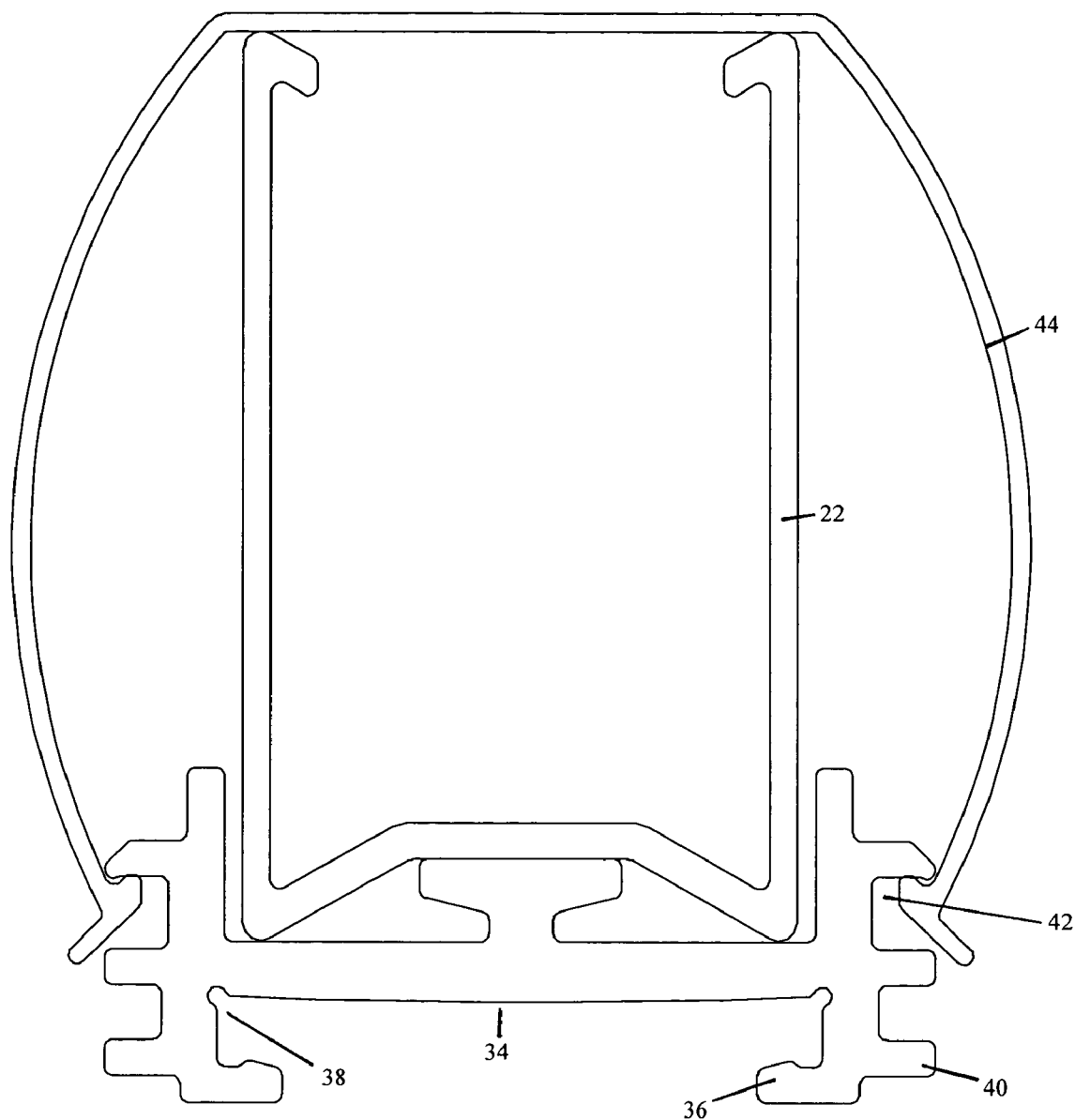
FIG. 7 is a cross section of the support structure of the inventive lighting assembly.

Turning now to FIGS. 5 and 6, the inventive lighting structure is shown. The structure comprises a support rail ("carrier") 30, preferably made of aluminum. Preferably, the support rail 30 has a channel 34 for receiving the light engine and at least two pair of external ribs 40 defining a mounting slot 42. The external ribs also dissipate heat. More preferably, the support rail 30 has a base 32, a channel 34 for receiving the light engine, a pair of ears 36, a pair of internal grooves 38, at least two pair of external ribs 40 that define at least one mounting slot 42.

The light engine comprises a printed circuit board (PCB) 52, preferably a metal core PCB with a plurality of LEDs 54 mounted thereon. The PCB 52 is in the form of a strip that slides into the channel 34 and is held in the internal grooves 38. Preferably, the LEDs 54 is power package LEDs 54. Preferably, the LEDs are spaced equally along the strip. A shim is used to secure the PCB 52 to the rail 30 and ensure a snug fit. Preferably, the shim is a collar 56 that surrounds at least one LED 54. The LEDs 54 are powered by a power supply 60. Preferably, the PCB 52 is connected to the power supply 60 by wires 62 and the power supply 60 is remote from the light engine. For example, the power supply 60 could be placed under the plants 24 to prevent it from blocking any of the natural sunlight. The power supply can power more than one light engine.

An attachment hook 44 or other mechanical attachment means is used to attach the rail 34 to the greenhouse frame 22. The attachment hook 44 is attached to the rail 30 at the mounting slots 42. The attachment hook 44 is attached to the roof of the greenhouse or to an existing support frame 22.

The light engines are relatively light. Thus, the greenhouse can be built so the frame can support the greenhouse.

Extra weight of the lamps does not need to be a consideration when determining the frame strength and/or design.

Further, the LEDs can be located close to or away from the plants. Thus, the light engines can be retrofit on an existing greenhouse frame. In addition, because the LEDs do not have to be kept away from the plants, the greenhouse can be built lower to the ground. This saves materials and may allow lighter weight frames to be used. It may also allow for reduced heating and/or cooling costs since the area to be heated or cooled may be smaller than in conventional greenhouses.

In one embodiment, the rails and light engines are approximately the same length and a plurality of rails 30 each with a light engine are used for each row where each light engine can either have a separate power supply 60, or preferably several light engines are electronically connected to a single power supply 60. In the preferred embodiment, the rails 30 are longer than the light engines. Pluralities of light engines are slid into the channel 34. The light engines are electronically interconnected. Preferably, one power supply 60 powers several light engines.

In one embodiment, each rail 30 is separated from the next rail 30 in the row. In an alternative embodiment, several rails 30 are interconnected. In another embodiment, each row comprises a single rail.

Figure 8:
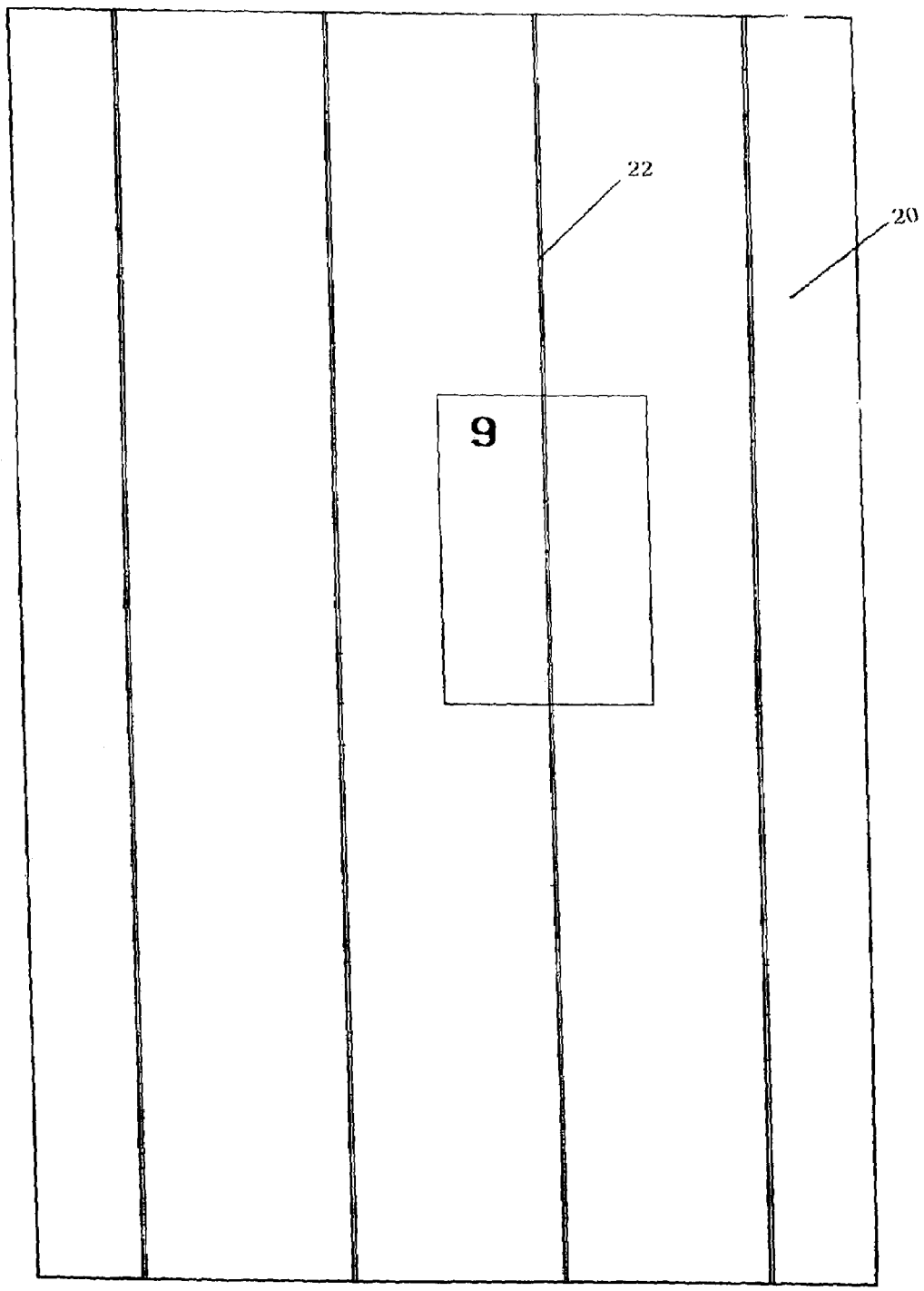
FIG. 8 is an overhead view of the inventive lighting system.
Figure 9:
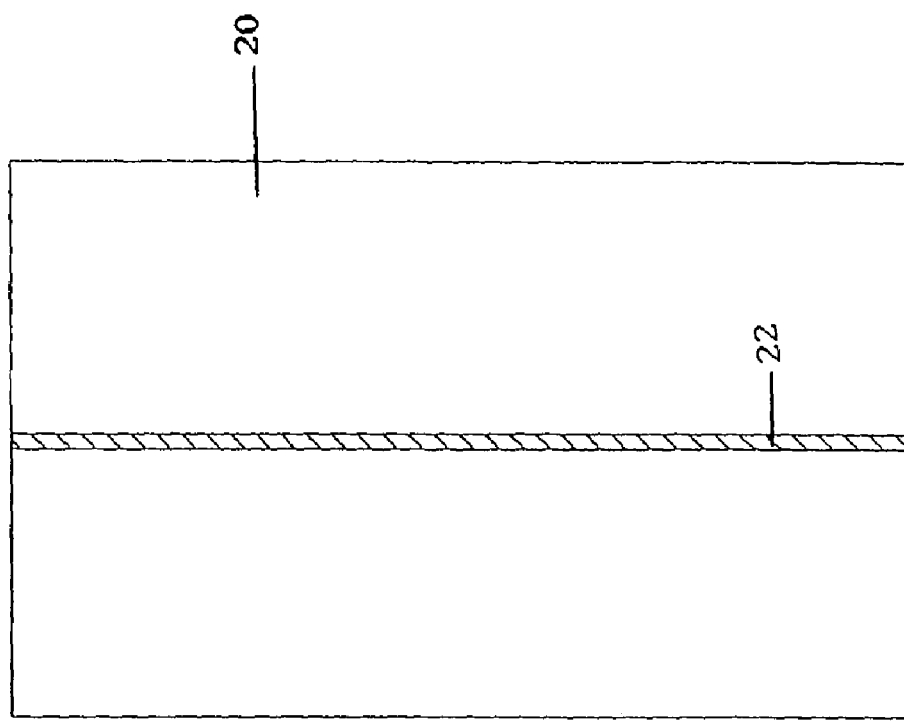
FIG. 9 is an overhead view of detail 9 of FIG. 8.
Figure 10:
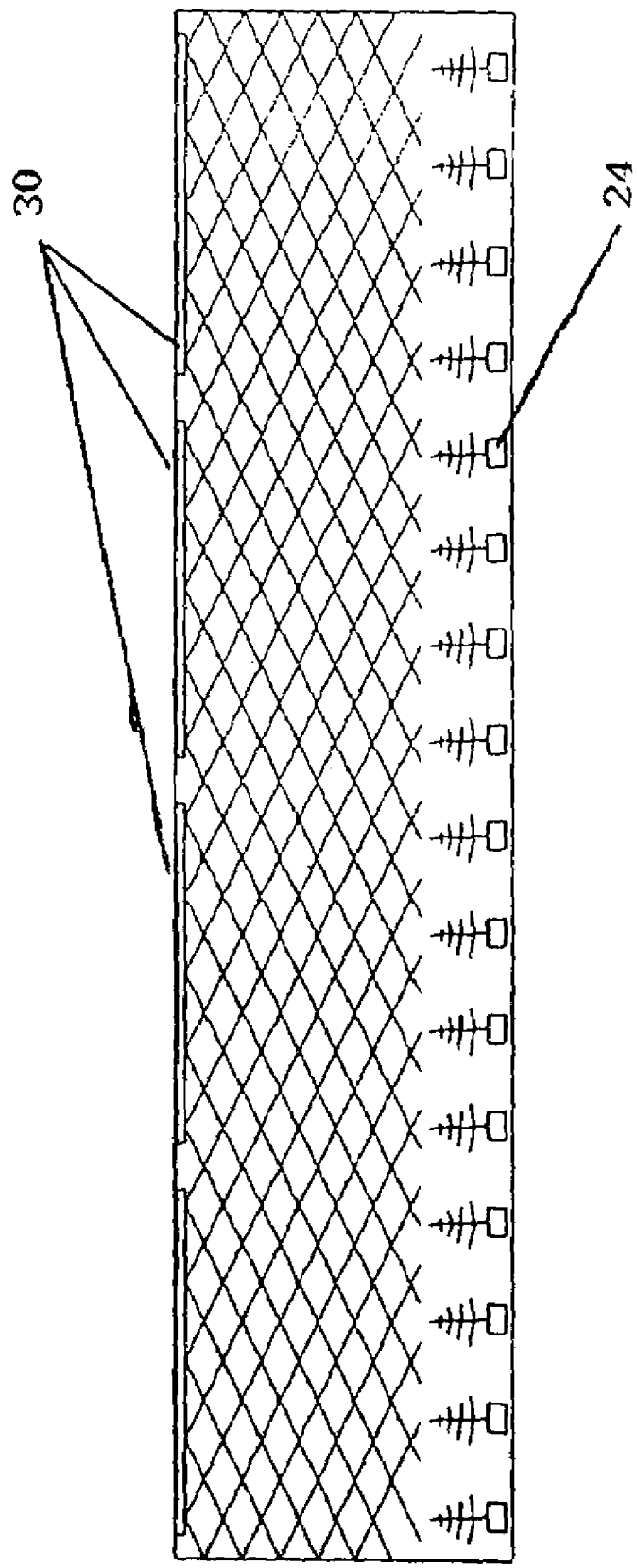
FIG. 10 is a side view of the inventive lighting system.
Figure 11:
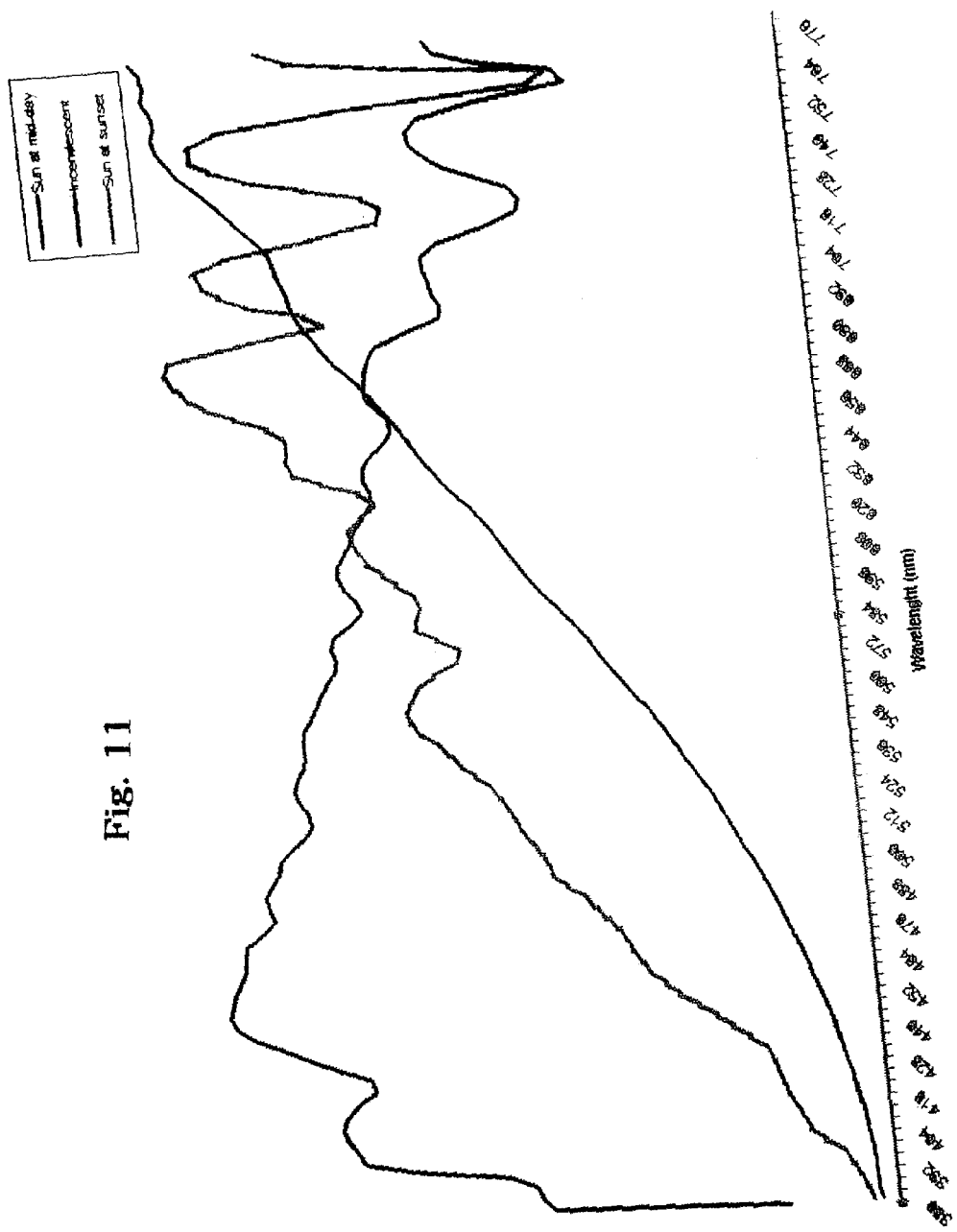
FIG. 11 shows the spectral distribution of sunlight at mid-day during the summer, at sunset during the summer and of an incandescent lamp.
Figure 12:
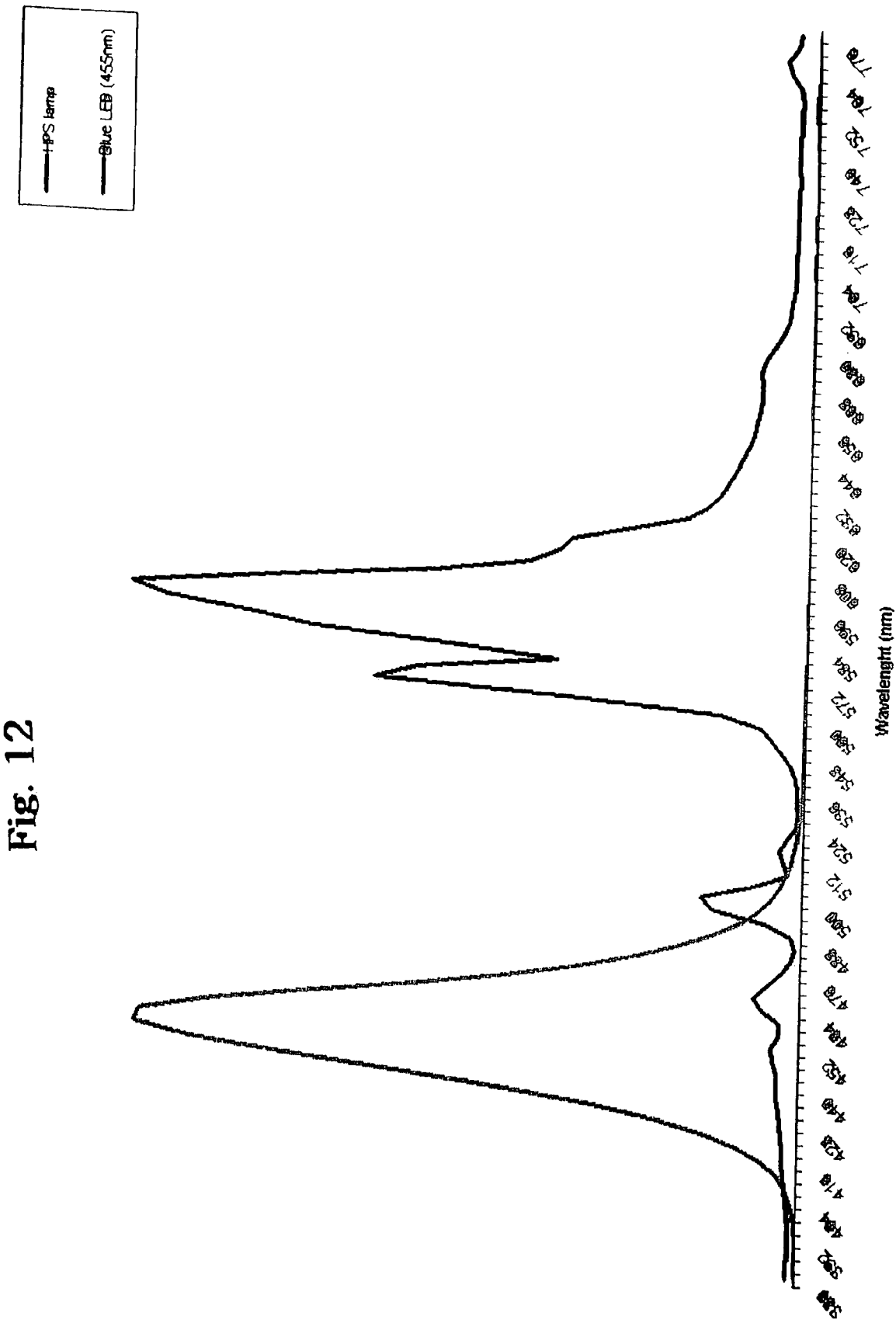
FIG. 12 shows the spectral distribution of a high-pressure sodium vapor lamp and a 455 nm blue LED.

As can be seen by FIGS. 8–10, the LED strip system provides even light to the plants without substantially affecting the amount of natural light received by the plants. In one embodiment, the rail 30 is about 1½ times as wide as a standard frame 22 for a commercial greenhouse. In another embodiment, the rail 30 is approximately the same size as a standard frame 22. In yet another embodiment, the rail 30 is narrower than the frame 22. Preferably, the rails 30 are 4.5 cm wide and 240 cm long. Preferably, the light engine is 60 cm long and 3 cm wide. In the preferred embodiment, the LEDs 54 are mounted on narrow rails 30.

The rails 30 are mounted on the existing frame 22 of the greenhouse between the rows of plants. The frame 22 acts as a cooling structure for the LEDs 54.

In the preferred embodiment the LEDs 54 and the attachment rail 30 take up less than 25% of the lighted area 20 of the greenhouse.

In an alternative embodiment, the LEDs 54 and the rail 30 take up less than 15% of the lighted area 20 of the greenhouse.

In an alternative embodiment, the LEDs 54 and the rail 30 take up less than 10% of the lighted area 20 of the greenhouse.

In an alternative embodiment, the LEDs 54 and the rail 30 take up less than 5% of the lighted area 20 of the greenhouse.

In an alternative embodiment, the LEDs 54 and the rail 30 take up less than 3% of the lighted area 20 of the greenhouse.

High-energy LEDs 54 can be used to supplement natural or artificial light. Preferably, light between approximately 400 and 500 nm is used. This light is almost invisible to humans. In one embodiment, LEDs 54 with a peak emission of 435 nm are used. In another embodiment, LEDs with a peak emission of 455 nm are used. In another embodiment, some or all of the LEDs are of a desired wavelength to supplement the light or to obtain a desired growth characteristic.

The invention claimed is:

1. A greenhouse lamp comprising:
   at least one PCB,
   at least one LED mounted on said at least one PCB;
   a carrier having a heat sink, said at least one PCB attached to said carrier;
   a shim, said shim securing the PCB to said carrier;
   a clamp adapted for mounting said lamp; and
   a power supply.

2. The greenhouse lamp of claim 1 where the clamp is adapted for mounting said lamp to a greenhouse frame.

3. The greenhouse lamp of claim 2 where the width of the carrier is less than 5 cm.

4. The greenhouse lamp of claim 1 wherein the carrier is about 4.5 cm wide and about 240 cm long and the PCB is about 3 cm wide and about 60 cm long.

5. The greenhouse lamp of claim 1 further comprising a plurality PCBs each having at least one LED, wherein the PCBs are attached to the carrier.

6. The greenhouse lamp of claim 1 wherein carrier comprises a base with a channel for receiving the PCB.

7. The greenhouse lamp of claim 1 wherein the PCB is a metal core PCB strip and a plurality of power package LEDs are mounted on the PCB strip.

8. The greenhouse lamp of claim 6 wherein the PCB is a metal core PCB strip and the PCB strip is slidably mounted in the channel.

9. The greenhouse lamp of claim 1 wherein the power supply is remote from the carrier.

10. The greenhouse lamp of claim 1 wherein the shim is a collar surrounding one LED.

11. The greenhouse lamp of claim 7 further comprising a heat sink.

12. The greenhouse lamp of claim 1 wherein at least one of the LEDs has a peak emission at a desired wavelength.

13. The greenhouse lamp of claim 12 wherein the desired wavelength is about 435 nm.

14. The greenhouse lamp of claim 12 wherein the desired wavelength is about 455 nm.

15. The greenhouse lamp of claim 12 wherein the desired wavelength is about 470 nm.

16. A plant growth lamp comprising:
   at least one PCB;
   at least one LED mounted on said at least one PCB, said at least one LED having a desired wavelength;
   a carrier having:
      a heat sink,
      at least one external mounting slot, said at least one PCB attached to said carrier via a shim;
   a clamp adapted to attach to said at least one external mounting slot, said clamp adapted for mounting said lamp; and
   a power supply.

17. The plant growth lamp of claim 16 wherein at least one of the LEDs has a peak emission at a desired wavelength.

18. The plant growth lamp of claim 17 wherein the desired wavelength is about 435 nm.

19. The plant growth lamp of claim 17 wherein the desired wavelength is about 455 nm.

20. The plant growth lamp of claim 17 wherein the desired wavelength is about 470 nm.

21. The plant growth lamp of claim 16 where the clamp is adapted for mounting said lamp to a greenhouse frame.

22. The plant growth lamp of claim 21 where the width of the carrier is less than 150% the width of the greenhouse frame.

23. The plant growth lamp of claim 16 wherein the carrier is about 4.5 cm wide and about 240 cm long and the PCB is about 3 cm wide and about 60 cm long.

24. The greenhouse lamp of claim 16 further comprising a plurality PCBs each having at least one LED, wherein the PCBs are attached to the carrier.

25. The greenhouse lamp of claim 16 wherein carrier comprises a base with a channel for receiving the PCB.

26. The greenhouse lamp of claim 25 wherein the PCB is a metal core PCB strip and the PCB strip is slidably mounted in the channel.

27. The greenhouse lamp of claim 16 wherein the PCB is a metal core PCB strip, a plurality of power package LEDs are mounted on the PCB strip and said LEDs are equally spaced along the PCB strip.

28. The greenhouse lamp of claim 27 further comprising a heat sink.

29. The greenhouse lamp of claim 16 wherein the powers supply is remote from the carrier.

30. The greenhouse lamp of claim 16 wherein the shim is a collar surrounding one LED.

31. A greenhouse lighting assembly comprising:
at least one carrier;
at least one light engine comprising a plurality of LEDs mounted on a PCB strip; said at least one light engine attached to said at least one carrier; and
a shim securing the PCB strip in the carrier.

32. The lighting assembly of claim 31 where the at least one carrier is adapted to be attached to a greenhouse frame.

33. The lighting assembly of claim 32 where the width of the at least one carrier is about 150% the width of the greenhouse frame.

34. The lighting assembly of claim 32 wherein the width of the at least one support rail is about equal the width of the greenhouse frame.

35. The lighting assembly of claim 32 wherein the width of the at least one carrier is narrower than the width of the greenhouse frame.

36. The lighting assembly of claim 31 wherein the at least one carrier is about 4.5 cm wide and about 240 cm long.

37. The lighting assembly of claim 31 wherein the light engine is about 3 cm wide and about 60 cm long.

38. The lighting assembly of claim 31 further comprising a plurality of light engines, wherein more than one light engine is attached to the at least one carrier.

39. The lighting assembly of claim 31 wherein the at least one carrier comprises a base with said channel; said PCB strip is a metal core PCB strip, and the PCB strip is slidably mounted in the channel.

40. The lighting assembly of claim 39 further comprising a power supply.

41. The lighting assembly of claim 31 further comprising a clamp adapted for mounting the carrier to the greenhouse frame.

42. The lighting assembly of claim 41 wherein the lighting assembly is attached to a greenhouse frame.

43. The lighting assembly of claim 42 wherein the assembly further comprises a plurality of parallel rows, each row comprises at least one carrier.

44. The lighting assembly of claim 42 wherein each row is substantially the same length as the length of a lighted area of the greenhouse and the rows are arranged to provide substantially uniform even lighting.

45. The lighting assembly of claim 42 wherein the lighting assembly does not substantially reduce the amount of natural light received into the green house.

46. The lighting assembly of claim 43 wherein the lighting assembly covers less than 15% of the lighted area of the greenhouse.

47. The lighting assembly of claim 46 wherein the lighting assembly covers less than 10% of the lighted area of the greenhouse.

48. The lighting assembly of claim 47 wherein the lighting assembly covers less than 5% of the lighted area of the greenhouse.

49. The lighting assembly of claim 48 wherein the lighting assembly covers less than 3% of the lighted area of the greenhouse.

50. The lighting assembly of claim 31, wherein the shim is a collar surrounding one LED.

51. The lighting assembly of claim 31 wherein the light engine further comprises a heat sink.

52. A lamp for illuminating plants comprising:
a carrier having a channel;
a PCB slideably attached to said carrier;
a LED mounted on said PCB;
a collar that surrounds said LED to secure said PCB in said channel.

53. A plant illumination system comprising:
a carrier having at least one external mounting slot;
at least one PCB attached to said carrier;
a shim that secures the PCB strip in the carrier;
at least one LED mounted on said at least one PCB; and
a clamp attached to said at least one external mounting slot for mounting said system to an associated support frame.

54. A lighting system for plants comprising:
at least one PCB having a heat sink;
at least one LED mounted on said at least one PCB;
a carrier having
a receiving channel; and
at least one external mounting slot, said at least one PCB is attached to said receiving channel of said carrier through a shim;
a clamp that cooperates with the at least one external mounting slot for mounting said lighting system; and
a power supply.

* * * * *